United States Patent [19]

Appleton et al.

[11] Patent Number: 4,771,837

[45] Date of Patent: Sep. 20, 1988

[54] WEIGHING SYSTEM

[75] Inventors: Gregory H. Appleton, Gardner; Paul D. Mikelk, Berlin, both of Mass.

[73] Assignee: Breakthru Industries, Inc., Clinton, Mass.

[21] Appl. No.: 50,321

[22] Filed: May 14, 1987

Related U.S. Application Data

[63] Continuation-in-part of Ser. No. 922,064, Oct. 20, 1986, Pat. No. 4,714,122.

[51] Int. Cl.[4] ....................... G01G 19/08; G01G 19/10

[52] U.S. Cl. .................................... 177/139; 177/141; 177/145

[58] Field of Search ......................... 177/145, 139, 141

[56] References Cited

U.S. PATENT DOCUMENTS 4,645,018 2/1987 Garbade et al. ................ 177/145 X

*Primary Examiner*—George H. Miller, Jr.

*Attorney, Agent, or Firm*—Blodgett & Blodgett

[57] ABSTRACT

A weighing system for a refuse truck having lifting means for engaging and lifting a refuse container. The weighing system comprises a transducer which is mounted on the lifting means of the truck for sensing the weight of the refuse container for producing an electrical analog signal. Electrical digitizing means convert and analog signal to a digital signal which is indicative of the weight which is sensed by the transducer. A limit switch is operatively connected to the transducer so that the transducer is energized at a point when a full container is supported by the lifting means and when an empty container is supported by the lifting means for the purpose of determining the weight of the refuse in the container.

5 Claims, 8 Drawing Sheets

Fig.11
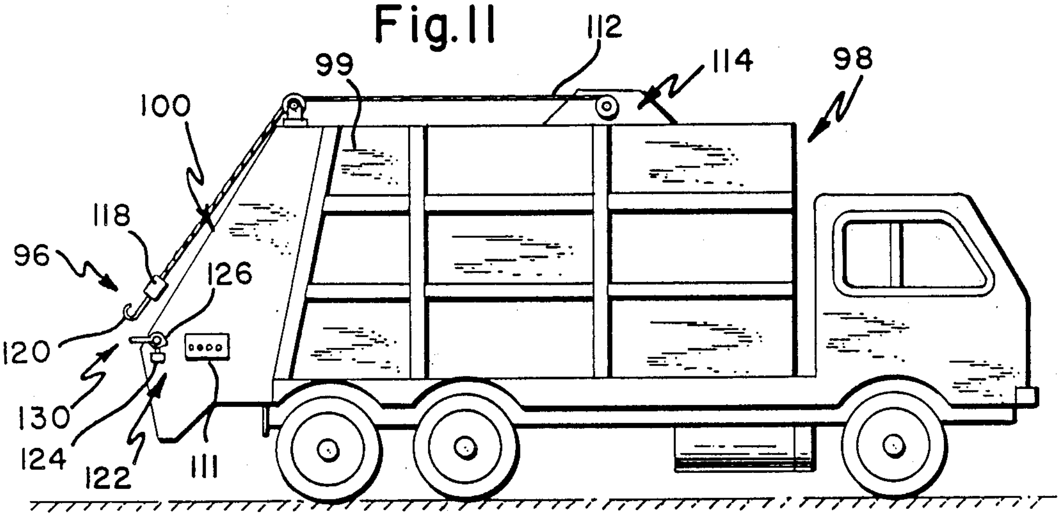
Fig.12
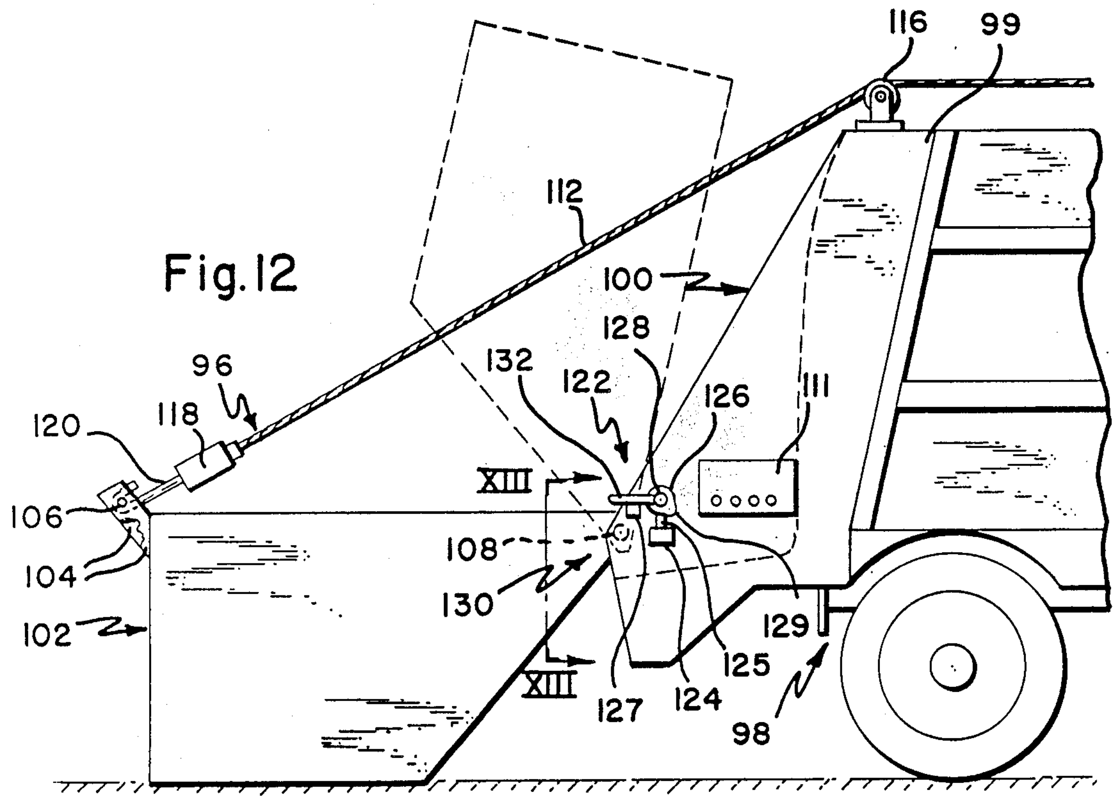
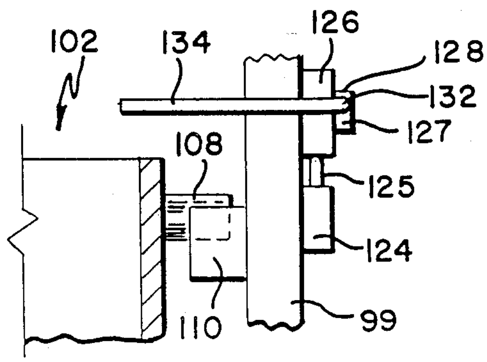
Fig.13

WEIGHING SYSTEM

BACKGROUND OF THE INVENTION

This application is a continuation-in-part of application Ser. No. 922,064, Oct. 20, 1986, Pat. No. 4714,122.

This invention relates generally to a weighing and recording system for refuse trucks. The invention is particularly directed to a weighing and recording system for refuse trucks of the type which pick up refuse or trash which is contained in large special refuse containers. There are several types of refuse trucks and refuse containers. The trucks and containers have complimentary engaging elements which enable a truck to lift its complimentary container from a lower resting position to an upper dumping position from which the contents of the container spill out of an opening in the container into an opening in the refuse receptacle of the truck. The refuse trucks are identified as "front end loaders", "rear end loaders", and "side loaders". Each refuse container is specifically adapted for a specific type of truck. Some trucks are also adapted with special lifting elements for handling smaller refuse containers, such as barrels or carts which are equipped with complimentary lifting elements.

The refuse trucks to which the present invention is directed are equipped with means for compacting the refuse so that the truck is capable of picking up refuse or trash from a large number of locations before the truck is completely full and ready for dumping at a specified dumping site. A fee is charged at the dumping site which is based on the poundage of the refuse which is dumped. The fee is determined by weighing the truck before and after dumping and charging for the difference in the two weights. The owner or contractor of the refuse truck can determine his or her cost of operating the truck to determine the fee to be charged to the customers. The dumping fee represents one cost factor for the total cost of operating the refuse truck. At the present time, customers of the refuse pickup service pay a fixed fee for each refuse container of a particular type. This fee is arrived at by adding up all expenses and expected profits and dividing the total by the number of refuse containers serviced. The present system of setting charges for refuse pickup is objectionable to the contractor and to the customer for several reasons. Each truck has a particular route so that each refuse container is serviced on a specified day of the week and usually at a specified time of the day. Since each business and individual is unique there is great variation in the amount and nature of refuse in each container on the route. Some containers are nearly full at the time of pickup and some containers are nearly empty. Also, the type of refuse varies so that between two equally full containers, the refuse in one container may weigh a great deal mcre than refuse in the other container. There is, of course, a cost involved in servicing all containers, whether they are full or empty. However, the cost of servicing full, heavy containers is greater due to the higher weight charge at the dumping site. Also, the capacity of the refuse truck is reached more quickly, thereby increasing the number of trips to the dumping site. By charging a fixed fee for each container serviced, the contractor has no way of distinguishing profitable accounts from non-profitable or less profitable accounts. Also, the customers are not charged fairly for the amount of refuse being picked up. Some customers whose refuse containers are never full when serviced or whose refuse containers contain low density refuse pay a lot more than they should. These and other difficulties experienced with the prior art refuse trucks have been obviated by the present invention.

It is, therefore, a principle object of the invention to provide a weighing system for a refuse truck which is capable of determining the weight of refuse in a refuse container as it is being serviced for the purpose of determining a per weight charge to the customer.

Another object of this invention is the provision of a weighing system for refuse trucks for determining when the weight capacity of a truck has been reached.

A further object of the present invention is the provision of weighing system for refuse trucks for determining the weight of refuse in each refuse container being serviced and for recording the weight for billing purposes.

It is another object of the present invention to provide a weighing system for different types of refuse trucks to determine the weight of refuse in different types of refuse containers serviced by the trucks.

A still further object of the present invention is the provision of a weighing system for refuse trucks which automatically determines the weight of refuse in a refuse container as it is being serviced by the truck, requiring no attention on the driver's part except to note the identity of the customer being serviced.

With these and other objects in view, as will be apparent to those skilled in the art, the invention resides in the combination of parts set forth in the specification and covered by the claims appended hereto.

SUMMARY OF THE INVENTION

In general, the invention consists of a weighing system for a refuse truck which is equipped with means for lifting a specific type of refuse container and dumping the contents of the refuse container into the truck. The weighing system comprises a transducer which is mounted on a refuse container lifting element of the truck for sensing the weight of the refuse container when it is full and when it is empty and for generating an electrical signal which is proportional to the weight which is sensed by the transducer. The weighing system also includes electrical digitizing means for converting the analog signal to a digital signal which is indicative of the weight which is sensed by the transducer, a source of electrical power, and a switch means, including a normally open switch which is operatively connected between the transducer and the source for electrical power, so that the switch is closed at a point during the lifting of a full refuse container and the lowering of an empty refuse container when the container is fully supported by the lifting means. The transducer is energized only when the switch is closed so that a signal is generated from the transducer at this point during the lifting and lowering the refuse container.

BRIEF DESCRIPTION OF THE DRAWINGS

The character of the invention, however, may be best understood by reference to one of its structural forms, as illustrated by the accompanying drawings, in which:

FIG. 11 is a right side elevational view of a refuse truck of the rear end loader type, showing a first modified weighing system of the present invention, FIG. 12 is a fragmentary right side elevational view of the rear portion of the truck on an enlarged scale showing the first modified weighing system applied to a refuse container of the type which is handled by a rear end loader, FIG. 13 is a fragmentary vertical cross-sectional view taken along line XIII—XIII of FIG. 12, showing the switch means for the first modified weighing system, FIG. 24 is a right side elevational view of a refuse truck of the rear end loading type, showing a fourth modified weighing system of the present invention, and FIG. 25 is a fragmentary plan view of the fourth modified weighing system.

DETAILED DESCRIPTION OF THE INVENTION

Figure 1:
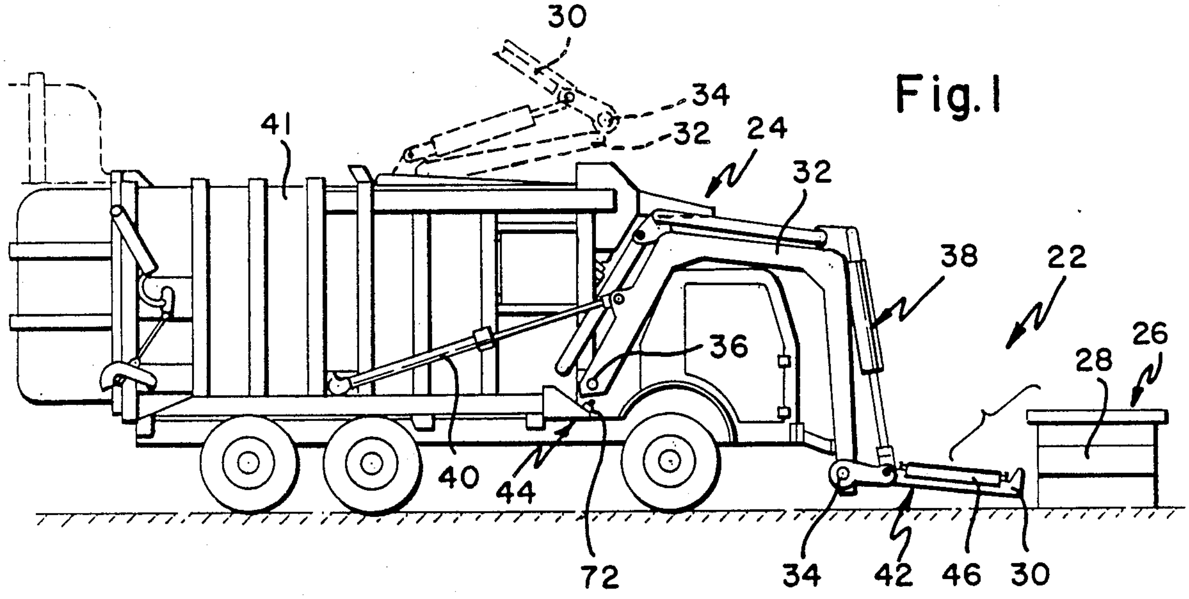
FIG. 1 is a right-hand elevational view of a refuse truck which is equipped with a weighing system embodying the principles of the present invention.
Figure 2:
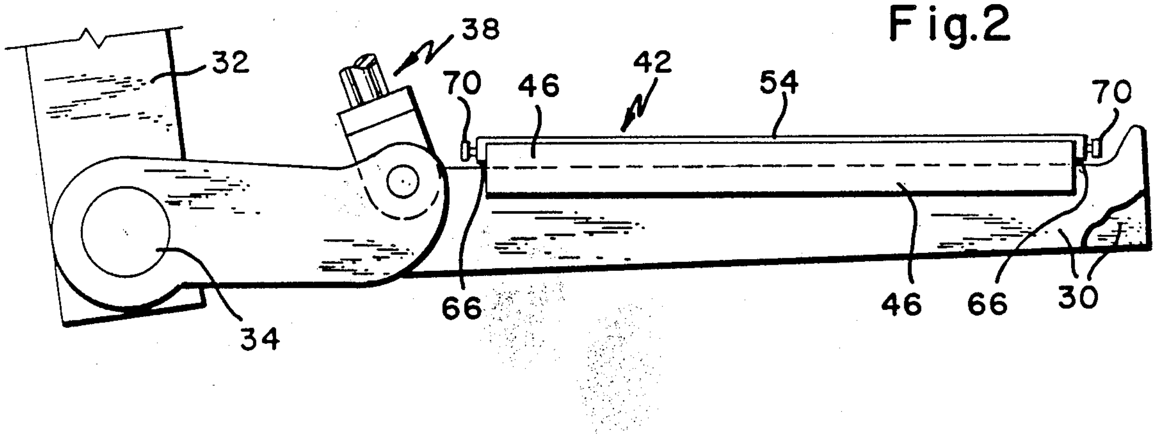
FIG. 2 is a fragmentary side elevational view on an enlarged scale of one of the support arms of the truck with a transducer fixture applied thereto.
Figure 3:
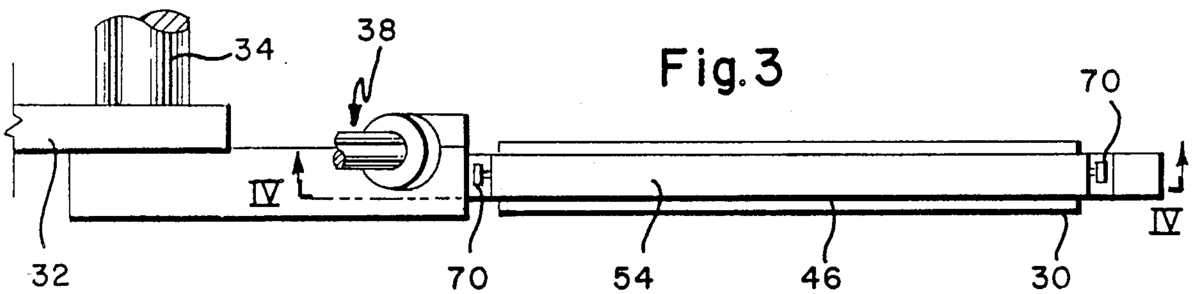
FIG. 3 is a plan view of the support arm and transducer fixture of FIG. 2.
Figure 4:
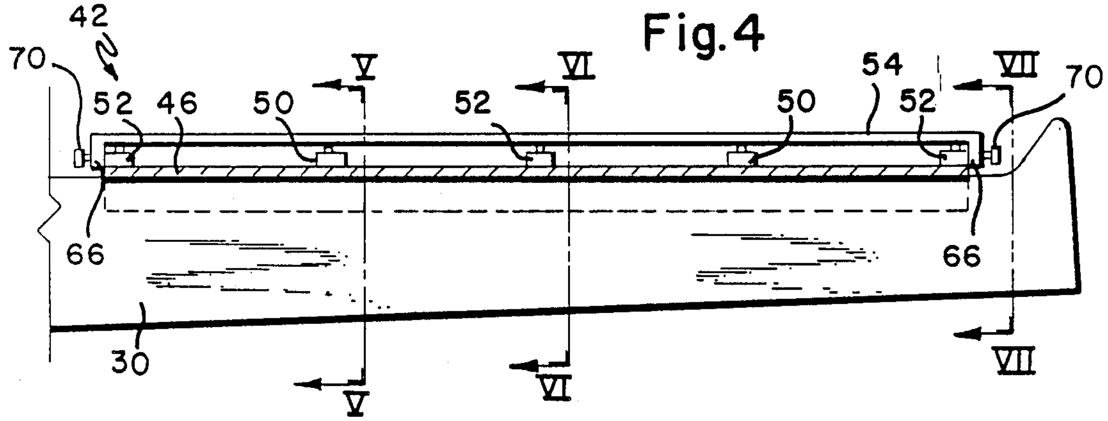
FIG. 4 is a vertical cross-sectional view taken on the line IV—IV of FIG. 3 on a more enlarged scale.
Figure 5:
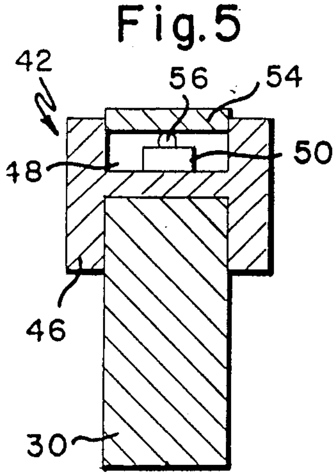
FIG. 5 is a vertical cross-sectional view on a more enlarged scale, taken along line V—V of FIG. 4 and looking in the direction of the arrows.
Figure 6:
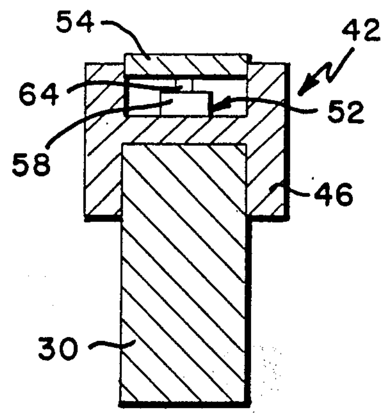
FIG. 6 is a vertical cross-sectional view on a still more enlarged scale, taken along line VI—VI of FIG. 4 and looking in the direction of the arrows.
Figure 7:
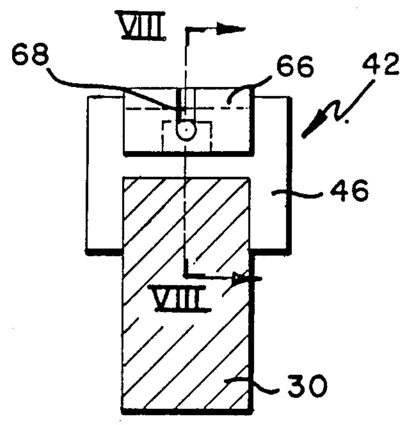
FIG. 7 is a vertical cross-sectional view taken along line VII—VII of FIG. 4 and looking in the direction of the arrows.
Figure 8:
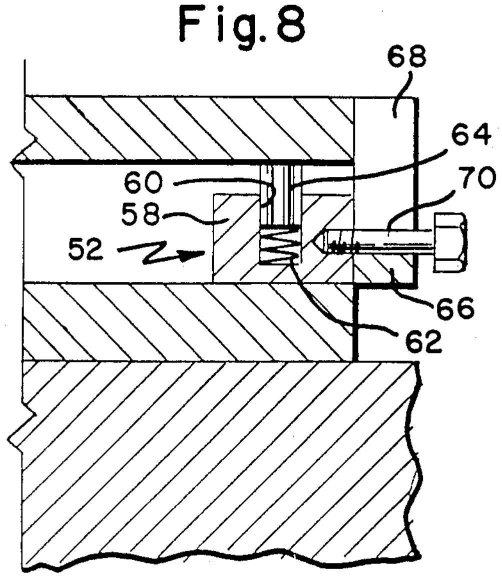
FIG. 8 is a vertical cross-section view taken on along line VIII—VIII of FIG. 7 and looking in the direction of the arrows.
Figure 9:
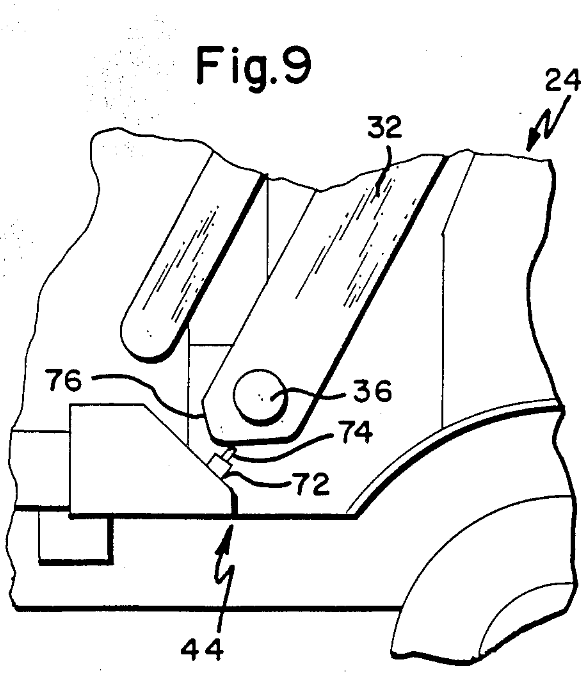
FIG. 9 is a fragmentary side elevational view of part of the lifting mechanism of the truck and switch means for activating the transducer.

Referring first to FIG. 1, there is illustrated a first embodiment of a weighing system of the present invention which is generally indicated by the reference numeral 22. The weighing system 22 is shown in FIG. 1 applied to a front end loader refuse truck generally indicated by the reference numeral 24. The refuse truck 24 is adapted to handle a complimentary refuse container, generally indicated by the reference numeral 26, which has an open top and an open ended sleeve 28 along each side of the container. The refuse truck 24 includes a pair of forwardly extending support arms 30 which are adapted to enter the sleeves 28 for engaging and lifting the container 26 in a manner to be described. Each support arm 30 is pivotally connected to an inverted U-shaped boom 32 by means of a pivot pin 34. The boom 32 is, in turn, pivotally connected to the side of the truck by a pivot pin 36. The support arm 30 is pivoted about the pin 34 by means of a first hydraulic actuator, generally indicated by the reference numeral 38. The boom 32 is pivoted about the pin 36 by means of a second hydraulic actuator, generally indicated by the reference numeral 40. The truck driver can control the operation of the first and second actuators independently throughout a dumping operation.

When the container 26 is to be serviced, the truck 24 is driven toward the refuse container 26 so that the support arms are positioned in front of the container. By controlling the first and second actuators, the driver positions the support arms 30, so that they are generally horizontal and in horizontal alignment with the sleeves 28. The container 26 may be resting on the ground at the same level as the truck or it may be located at an elevated location. When the support arms 30 are aligned with the sleeves 28, the truck is moved forwardly so that the support arms enter the sleeves 28. The boom 32 is then pivoted counterclockwise as viewed in FIG. 1 to raise the container 26 and bring it over the cab of the truck and above the refuse receptacle portion 41 of the truck. Throughout this motion, the driver of the truck also controls the operation of the first hydraulic actuator 38 to maintain the support arms 30 horizontal so that its open top of the refuse conainer remains horizontal to prevent spilling of the contents. When the container 26 reaches the dumping position above the receptacle 41, the support arms 30 are pivoted counterclockwise as viewed in FIG. 1 so that the open top of the container 26 faces down toward the open top of the receptacle 41. The dumping position of the boom 32 and the support arms 30 is shown in dotted lines in FIG. 1.

Referring again to FIG. 1, the weighing system 22 comprises a transducer, generally indicated by the reference numeral 42 and switch means generally indicated by the reference numeral 44. Referring also to FIGS. 2 thru 8, the transducer 42 includes a housing 46 on each support arm 30. As shown best in FIGS. 5 thru 7, the housing 46 is H-shaped in cross-section and is mounted on the support arm 30 so that the lower legs of the housing straddle the top of the support arm and are fixed to the support arm by means of welding or other fastening means. The upwardly-extending legs of the housing form an elongated horizontal channel 48 which contains a pair of pressure load cells 50 and a plurality of stop means generally indicated by the reference numeral 52. Any number of load cells and stop means may be used. In the example shown in FIG. 4, there are two load cells, a stop means at each end of the channel and one between the two load cells. Each load cell has an upwardly extending sensing element 56 which protrudes from the main body of the load cell. Each stop means 52 has a main body portion 58 and a plunger 64 which extends upwardly from the main body of the stop means. An elongated pressure plate 54 is also located in the channel 48 for vertical sliding movement within the channel and rests on the sensing elements 56 and the plungers 64. Each plunger 64 is slidably mounted vertically in a vertical hole 60 at the top of the main body 58. The plunger 64 is biased upwardly by means of a spring 62 at the bottom of the hole 60. The collective biasing force of all of the springs 62 is sufficient to support the pressure plate 54 so that it is positioned just above the sensing elements 56 and exerts little or no pressure on the sensing elements. When additional weight is placed on the pressure plate 54, the weight is detected by the sensors 56 and causes the pressure cells to generate an analog signal which is indicative of the weight sensed. Each sensor 56 is biased upwardly relative to the main body of the load cell and is forced into the main body of the load cell by downward pressure on the sensing element. The greater the weight or pressure on the sensing element, the greater the movement of the sensing element into the body of the load cell. There is a correlation between the amount of movement of the sensor relative to the main body portion of the pressure cell and the analog electrical signal which is generated by the load cell and, consequently, a correlation between the signal which is generated and the amount of pressure per weight which is applied to the sensing element. There are many types of pressure load cells and the load cells of each type are available in a plurality of ratings for particular applications. Each load cell has a functional range of motion. For any particular application, the load cells which are utilized operate within this range for all of the weights which are expected to be sensed for a particular application without exceeding the functional range of the load cell. In the present case, the capacity of the load cells, as a group, is greater than the heaviest load which is expected to be lifted by the support arms 30. However, the stop means 52 provide a safety feature against an unusually high application of force against the pressure plates 54 by limiting the downward movement of the pressure plates. If a downward pressure against the plates 54 exceeds tne capacities of the load cells 50, the bottom of the pressure plates 54 will strike the tops of the bodies 58 of the stop means 52 before the critical point of each pressure load cell is reached. Such an unusually high pressure can be caused by many factors such as an upward jerking motion of the support arms 30 at the beginning of a lifting operation of the striking of an obstruction during a lifting operation.

Each pressure plate 54 has a downwardly extending flange 66 at each end. Each flange 66 has a slot 68 which is spaced from the bottom of the flange. A screw 70 extends freely through the slot 68 and is threaded into the main body portion 58 of the adjacent stop means 52. The screws 70 restrain the plate 54 and maintain it within the channel 48 while allowing the pressure plate 54 to move vertically. There is sufficient clearance between the head of the screw 70 and the flange 66 to permit free vertical movement between the flange and the screw along the length of the slot 68.

Switch means 44 comprises a normally open switch 72 which includes an upwardly extending plunger 74 which is biased outwardly or upwardly from the main portion of the switch. The switch 72 is closed when the plunger 74 is depressed within the main body of the switch. The end of the right hand boom 32 is provided with a cam surface 76 just below the pivot pin 36. The switch 72 is fixed to the truck at a point just below the cam surface 76 so that when the booms 32 are in the lower pickup position shown in full lines in FIG. 1 and the dumping position shown in dotted lines in FIG. 1. The cam surface 76 is out of contact with the plunger 74 of the switch. However, at one point during the movement of the booms 32 between the extreme positions of the booms, the cam surface 76 engages and depresses the plunger 74 to close the switch 72. Therefore, the switch 72 is closed when the booms are at the same point relative to the truck body whether the booms are being moved toward the dumping position or from the dumping position. The positioning of the switch 72 is such that it will be closed when the refuse container 26 is fully supported on the support arms 30 whether it is full or empty. The closing point of the switch is selected to be above the highest starting position of any refuse container 26 on the pickup route for the truck. This means that in every case the refuse container will be fully supported on the support arms 30 before the switch 72 is closed for every refuse container on the route.

Figure 10:
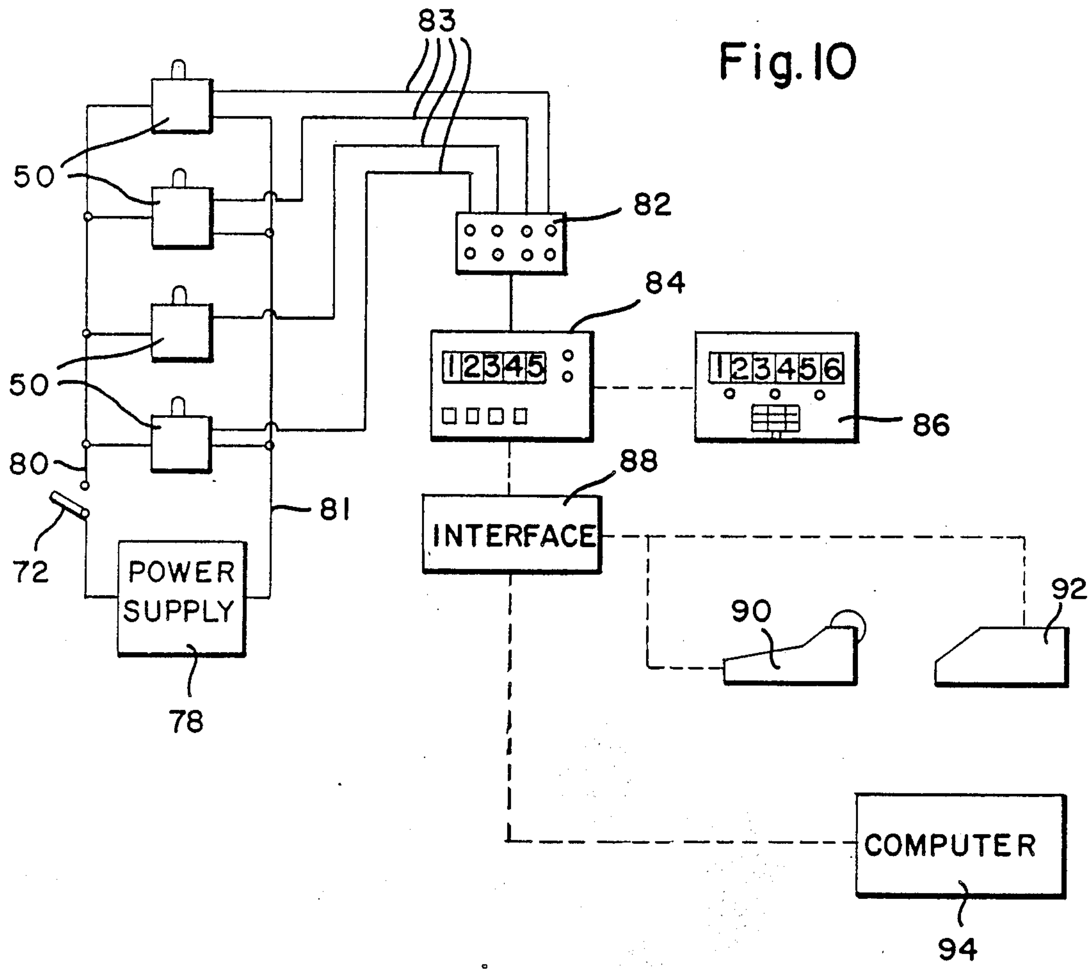
FIG. 10 is an electrical schematic diagram of the weighing system.
Figure 14:
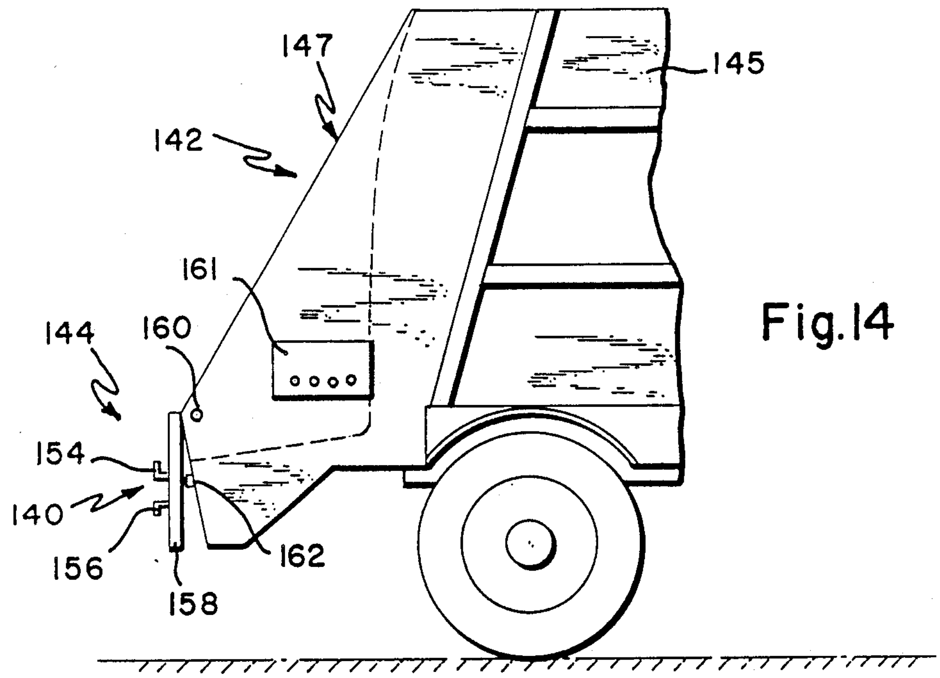
FIG. 14 is a fragmentary right side elevational view of the rear portion of a refuse truck which is equipped with a specialized lifting system for small containers to which is applied a second modified weighing system embodying the principles of the present invention.

The operation and advantages of the present invention will now be readily understood in view of the above description and in reference to the schematic diagram of the electronic control means which is illustrated in FIG. 10. Referring particularly to FIG. 10, the load cells 50 are connected to a source of electrical power 78 by means of power lines 80 and 81. Normally open switch 72 is located on power line 80 so that the load cells 50 are normally energized. The load cells 50 are connected to a junction box 82 of a load cell digitizer 84 by means of lines 83. When the load cells 50 are energized upon closing of the switch 72 an analog electrical signal is transmitted through the lines 83 to the load cells digitizer 84 for conversion into a digital signal which is proportional to the composite analog signals received by the digitizer. The digitizer 84 is provided with visual digital readout means which enable the truck operator to see each weight reading. The load cell digitizer 84 is also connected to a keyboard 86 for data input and selection of operational modes, such as net or gross weight, tare, track to 0 and printout. The digitizer 84 is also connected to a printer 90, a card punching machine 92 and a computer 94 through an interface 88. A specific weight on the support arms 30 causes the pressure load cells 50 to generate a specific composite analog electrial signal. A specific analog signal will produce a specific digital readout in the load cell digitizer 84. The computer 94 can be programmed to control the readout of the load cell digitizer 84 so that it corresponds with actual weight on the load cells. The printer 90 produces a permanent record of the refuse container when it is empty and when it is full and the difference between the two weights which represents the actual weight of the refuse for biIling purposes. The card punching machine also produces a card during these same figures which can be given to the customer as a receipt. The entire weighing operation is completely automatic. All that is required of the driver is to punch in a customer identification number on the keyboard 86. This information will also be recorded on the printer 90 and the card punching machine 92.

At the beginning of a dumping operation, the operator positions the support arms within the sleeves 28 and raises the booms 32 so that the container 26 is fully supported on the arms. As the arms 30 are raised toward the dumping position at a predetermined point, the switch 72 is closed by the cam surface 76 which energizes the pressure cells 50. An electrical analog signal is generated from the cells 50 to the load cell digitizer 84 for recording the weight of the full container. When the predetermined point in the cycle is passed, the switch 72 opens to de-energize the cells 50 and the refuse from the container 26 is dumped into the receptacle 41 of the truck. The empty container 26 is then brought back toward the pickup position. When the same predetermined point is reached in the return portion of the cycle, the cam surface 76 again closes the switch 72 to energize the cells 50. The cells 50 then generate a composite electrical signal which is representative of the empty container and causes the load cell digitizer 84 to record a weight which represents the weight of the empty container. The computer 94 is programmed to cause the load cell digitizer to subtract the two weights to produce a readout of the difference between the two weights. This difference is recorded on the printer 90 and the card punching machine 92. The operator of the vehicle punches the customer identification number before or after a dumping operation so that the recorded weights are tied in with that particular customer.

SECOND EMBODIMENT OF THE INVENTION

Referring to FIGS. 11 thru 13, there is illustrated a second embodiment of the invention which is generally indicated by the reference numeral 96 for application to a refuse truck, generally indicated by the reference numeral 98, of the type which is known as a rear end loader. The truck 98 has a refuse receptacle 99 which has a rear opening 100 and which is adapted to handle a particular type of refuse container which is generally indicated by the reference numeral 102. The refuse container 102 has a pair of upwardly and rearwardly extending brackets 104 at the upper rear corner of the container at the middle of the rear edge. A horizontal rod 106 is fixed to and extends between the brackets 104. A pin 108 extends from each side wall of the container 102 adjacent the upper forward corner of the container. This pin 108 is adapted to be supported in a cradle 110 which is fixed to the inside surface of the truck receptacle 99. The cradles 110 are raised and lowered by hydraulic drive means, not shown. The pins 108 are engaged by backing the truck toward the container 102 with the cradles 110 in a lower position so that they pass under the pins 108. A second operator who is standing at the rear of the vehicle causes the cradles 110 to be raised into engagement with the pins 108 by pressing an appropriate button on a control panel 111. The container lifting mechanism of the truck comprises a cable 112 which is operatively connected at one end to a winch mechanism, generally indicated by the reference numeral 114. The cable 112 extends over an idler sheave 116 and is connected at its opposite end to a hook 120 which is adapted to engage the horizontal rod 106. The dumping operation is controlled by the operator at the rear of the truck who pushes another button on the control panel 111 for actuating the winch mechanism 114. As the cable 112 is drawn linearally by the winch mechanism 114, the rear end of the container 102 is lifted and pivoted about the cradles 110 from the full line position to the dotted line position as shown in FIG. 12. This causes the refuse in the container 102 to spill out of the container through the top opening and into the rear opening 100 of the truck receptacle 99. The refuse container is returned to its resting position when the operator at the rear of the vehicle presses another button to cause the winch mechanism 14 to release the cable 112 in a controlled manner. When the refuse container 102 is in its resting position, an additional amount of cable 112 is paid out to produce a slack which enables the operator to remove the hook 120 from the horizontal rod 106. The cradles 110 are then lowered by the operator to a point below the pins 108 to allow the truck to drive away from the, now empty, container 102.

The second embodiment 96 of the invention comprises a tension load cell 118 which is located between the hook 120 and the cable 112 and switch means, generally indicated by the reference numeral 122. The switch means comprises a normally open switch 124 which is identical to switch 72 and includes a plunger 125 which operates in the same manner as the plunger 74 to open and close the switch. The switch 124 is fixed to the outside of the truck body and is located below a cam 126 which is mounted for rotation with a shaft 128 which is rotatably mounted on the truck body. A detector, generally indicated by the reference numeral 130, is also fixed to the shaft 128. The detector 130 includes a rearwardly extending portion 132 which is fixed to the shaft 128 and a laterally extending portion 134 which extends inwardly from the portion 132 so that it extends above the top edge of the container 102 as shown in FIG. 13. The shaft 128 is biased counterclockwise as viewed in FIG. 12 by a coil spring, not shown, so that the portion 132 rests against a stop 127. The control circuitry for the weighing system 96 of the second embodiment of the invention is identical to that of the first embodiment illustrated in FIG. 10, except that a single tension load cell is utilized instead of a plurality of pressure load cells for generating a single analog signal to the load cell digitizer. The switch 124 is identical to the switch 72 for energizing and de-energizing the load cell.

A refuse pickup sequence is started by backing the truck 98 toward the refuse container 102, so that the cradles 110 are located just beneath the pins 108. The operator at the rear end of the truck presses a button on the panel 111 to raise the cradles 110 into engagement with the pins 108. The hook 120 is engaged with the rod 106 and another button on the control panel 111 is pushed to start the winch mechanism 114 which begins lifting the rear end of the refuse container 102 about the pivot pins 108. When the container 102 is raised to a predetermined point, the top of the container engages the lateral portion 134 of the detector 130 and causes the shaft 128 to rotate clockwise as viewed in FIG. 12. Partial rotation of the shaft 128 brings a high point 129 of the cam 126 into engagement with the plunger 125 and depresses the plunger 125 sufficiently to close the switch 124. When the switch 124 closes, the tension load cells 118 is energized and generates an electrical analog signal to the load cell digitizer for recording the weight of the full refuse container 102. Continued lifting of the refuse container beyond this predetermined point to the dumping position shown in dotted line in FIG. 12, causes additional rotation of the shaft 128 to bring the high point of the cam 126 beyond the plunger 125, thereby opening the switch 124. After the refuse within the container 102 has spilled out into the receptacle of the truck, the winch mechanism 114 is actuated to lower the container back to its starting position. When the container 102 reaches the predetermined point described above, the switch 124 is again closed by the cam 126 for generating another signal to the load cell digitizer 84. The weight of the empty container is thereby recorded for determining the weight of the refuse which was dumped into the truck.

THIRD EMBODIMENT OF THE INVENTION

Figure 15:
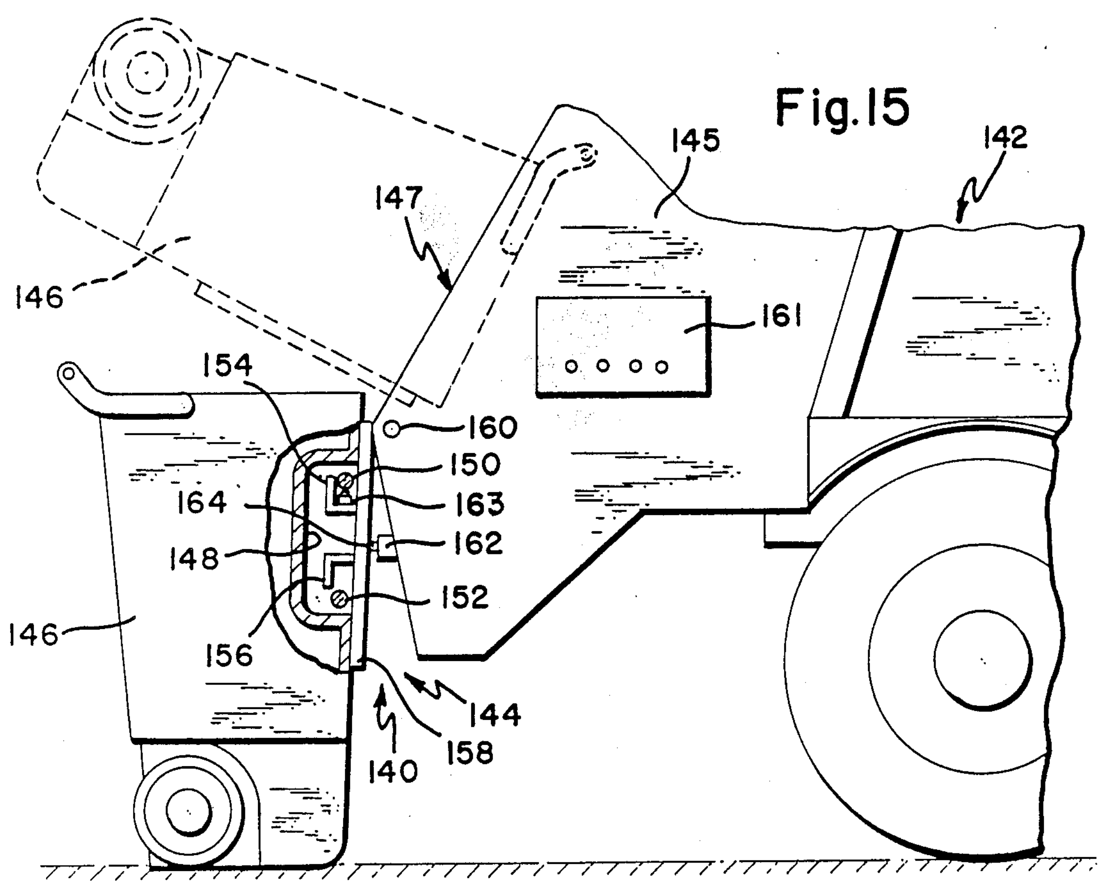
FIG. 15 is a view similar to FIG. 14 on an enlarged scale illustrating the specialized lifting apparatus and second modified weighing system applied to a small refuse container.

Referring to FIGS. 14 thru 20, there is illustrated a third embodiment of the present invention, generally indicated by the reference numeral 140. The weighing system 140 is shown applied to a refuse truck 142 which is equipped with a specialized container lifting apparatus, generally indicated by the reference numeral 144, which is adapted for handling a special wheeled cart 146 which is illustrated in FIG. 15. The truck has a refuse receptacle 145 which has a rear opening 147. The front wall of the cart 146 is provided with a recess 148 and a pair of spaced horizontal rods which extend across the recess for the purpose of enabling the cart to be engaged and lifted by the lifting apparatus 144 of the truck. The spaced rods consist of an upper rod 150 and a lower rod 152. These rods are positioned to cooperate with upper and lower hooks 154 and 156, respectively. The hooks 154 and 156 are fixed to a flat plate 158 which is pivotally mounted on the truck 142 by means of a pivot pin 160. The hooks 154 and 156 are generally L-shaped. The hook 154 points upwardly and the hook 156 points downwardly. The cart 146 is emptied by wheeling the cart toward the rear of the truck and positioning the upper rod 150 on the hook 154. The operator at the rear end of the truck then presses an appropriate button on the control panel 161 which causes a lifting mechanism, not shown, to pivot the plate 158 clockwise as viewed in FIGS. 14 and 15 about the pivot pin 160 from the resting position shown in full lines to the dumping position shown in dotted lines in FIG. 15. Initially, the cart 146 is supported on the upper hook 154 through the rod 150. However, just prior to reaching the dumping position of the cart, the weight of the cart shifts toward the top open end of the cart and the cart slides along the plate 158 so that the rod 152 engages the lower hook 156 for maintaining support of the cart. When the dumping position is reached, the refuse slides from the cart into the receptacle 145 through the opening 147. After the refuse has been dumped into the receptacle 145 at the back end of the truck, the operator presses another button on the control panel 161 for lowering the cart, whereupon the weight of the cart shifts back to the hook 154. The cart 146 is then removed from the hook 154 and wheeled away from the truck.

The weighing system 140 comprises a pressure load cell 163 which is mounted on the upper hook 154 and a normally open switch 162 which is fixed to the rear end of the truck in front of the plate 158. The pressure load cell 161 is positioned on the hook 154 so that when the cart 146 is mounted on the hook, the upper rod 150 rests on the sensing element of the pressure cell, as shown in FIG. 15. The switch 162 includes a plunger 164 which is normally biased outwardly toward the plate 158 but is normally depressed by the plate when the plate is in the rest position shown in FIG. 15.

Figure 18:
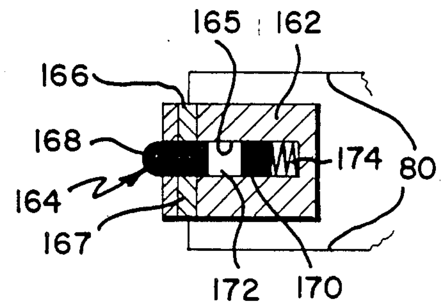
FIG. 18 is a vertical cross-sectional view of the limit switch of the second modified weighing system, showing the limit switch in a first open condition.
Figure 17:
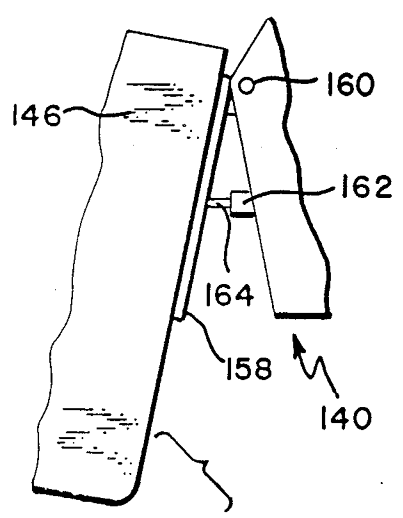
FIG. 17 is a view similar to FIG. 16, showing a limit switch in a different operating mode.
Figure 19:
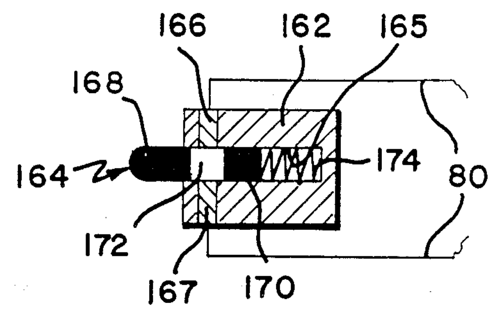
FIG. 19 is a view similar to FIG. 18, showing the limit switch of the second modification in a closed condition.
Figure 20:
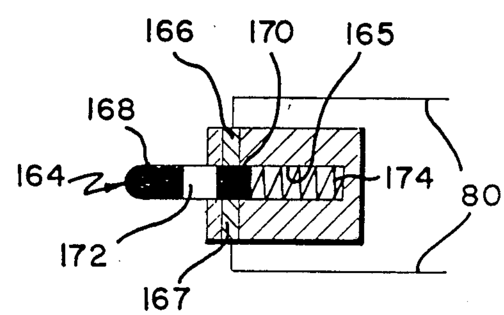
FIG. 20 is a view similar to FIG. 19, showing the limit switch of the second modified weighing system in a second open condition.

The details of switch 162 are shown in FIGS. 18 thru 20. The main body of the switch 162 is made of an insulating material and includes a bore 165 within which the plunger 164 is slidably mounted. A spring 174 is located at the base of the bore for biasing the plunger 164 to its outermost position shown in FIG. 20. A pair of electrical contacts 166 extend from the bore 165 and are connected to power line 80 for energizing and de-energizing the pressure load cell 161. The circuitry for the weighing system 140 is identical to that shown in FIG. 10 except that the load cells 50 are replaced by the single pressure load cell 163 and the switch 72 is replaced by the switch 162. The plunger 164 comprises an outer insulated portion 168, an inner insulated portion 170 and an intermediate electrically conductive portion 172. When the plunger 164 is depressed as shown in FIG. 18, the insulated portion 168 is aligned with the contacts 166 and 167, so that the switch 162 is effectively opened. When the plunger 164 is partially extended as shown in FIG. 19 so that the conductive portion 172 is aligned with the contacts 166 and 167, a circuit is completed through line 80, so that the switch 162 is effectively closed. When the plunger 164 is fully extended as shown in FIG. 20, the insulated portion 170 is aligned with the contacts 166 and 167 so that the switch 162 is again effectively opened.

Figure 16:
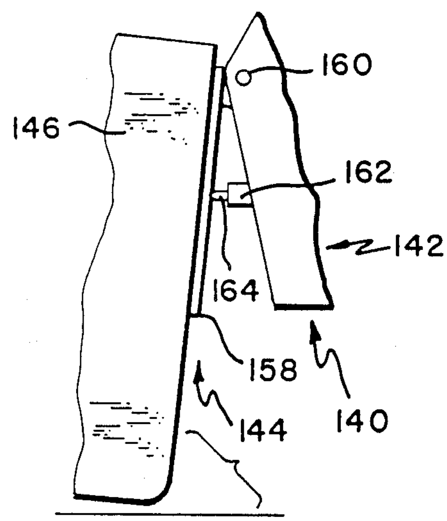
FIG. 16 is a fragmentary side elevational view showing a limit switch which forms part of the second modified weighing system.

At the beginning of a trash pickup cycle with the container 146 mounting on the lifting apparatus 144 as shown in FIG. 15, the plunger 164 of the switch 162 is depressed by the plate 158 so that the switch 162 is closed and the pressure cell 161 is de-energized. When the operator depresses the appropriate button on the control panel 161, the plate 158 is rotated about the pivot pin 160. This causes the container 156 to be lifted off the ground and to be fully supported by the lifting apparatus 144, as shown in FIG. 16. At this point, the plunger 164 is partially extended to the position shown in FIG. 19 so that the conductive portion 172 of the plunger is aligned with the contacts 166 and 167, thereby closing the switch 162. This energizes the pressure load cell 161 causing it to generate an electrical analog signal to the load cell digitizer 84 for recording the weight of the full cart 146. Additional rotation of the plate 158 past this point, enables the plunger 164 to be fully extended as shown in FIG. 20 so that the contacts 166 and 167 are aligned wlth the insulated portion 170 of the plunger. This opens the switch 162 and de-energizes the pressure load cell 161. When the cart 146 reaches the dumping position shown in dotted lines in FIG. 15, the contents of the cart spill into the rear opening 147 of the truck. The operator then depresses another button on the control panel 161 for returning the cart to its original starting position. The plate 158 is thereby rotated counterclockwise by the lifting mechanism, not shown, so that the plate returns to the position shown in FIG. 16. At this point the plunger 164 is partially depressed to the position shown in FIG. 19 so that the switch 162 is again closed, thereby energizing the pressure load cell 163. Another electrical analog signal is generated by the load cell 163 which is received by the load cell digitizer 84. However, this electrical signal differs from the first electrical signal and that it is indicative of the cart 146 minus its contents. The weight of the empty cart is thereby recorded for computing the weight of the refuse which has just been dumped into the truck. When the plate 158 is returned to its starting position as shown in FIG. 15, the cart 146 is removed from the lifting apparatus 144 and return to its storage location.

FOURTH EMBODIMENT OF THE INVENTION

Figure 21:
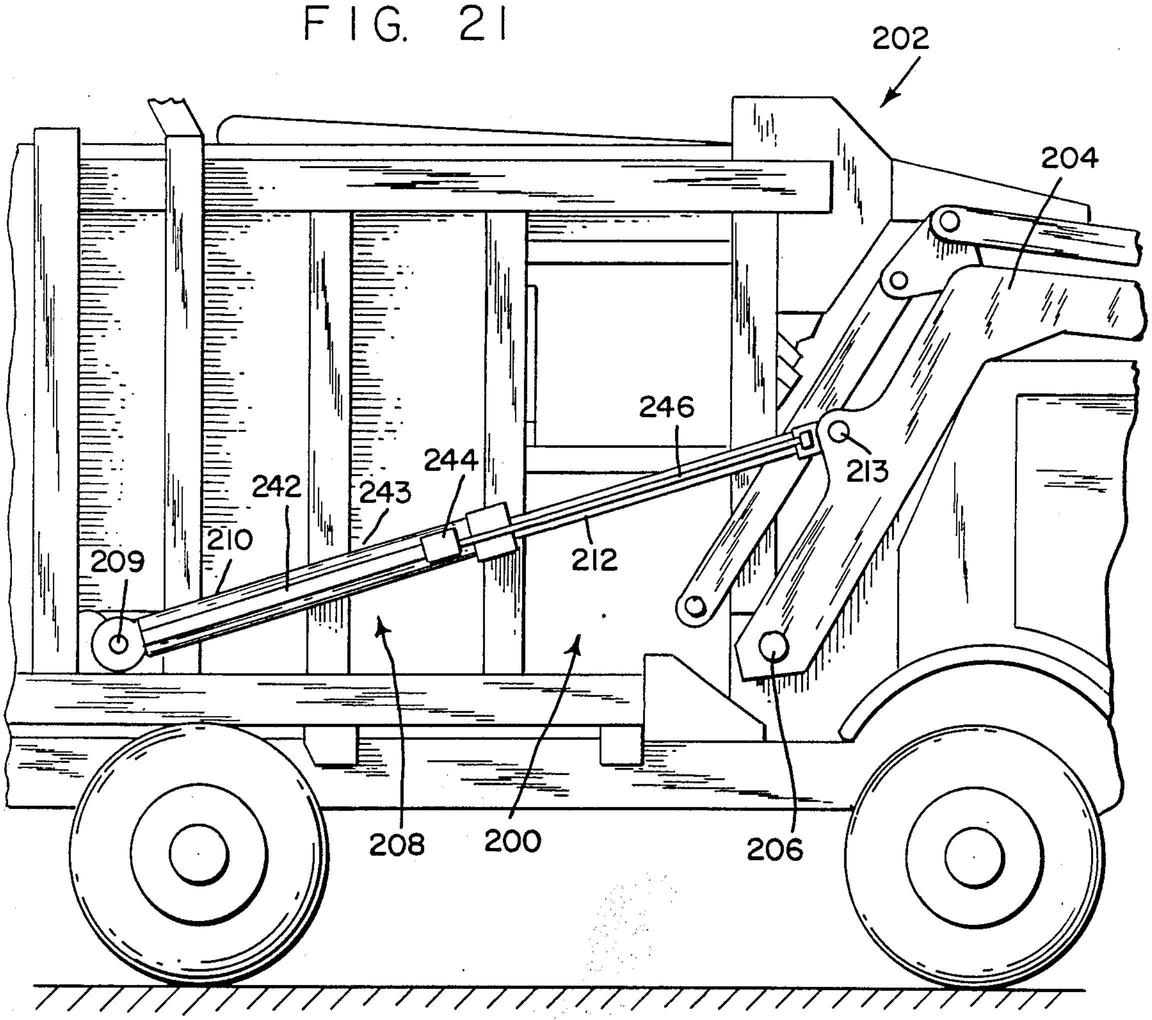
FIG. 21 is a right hand side elevational view of a front end loading refuse truck which is equipped with a third modified weighing system.
Figure 22:
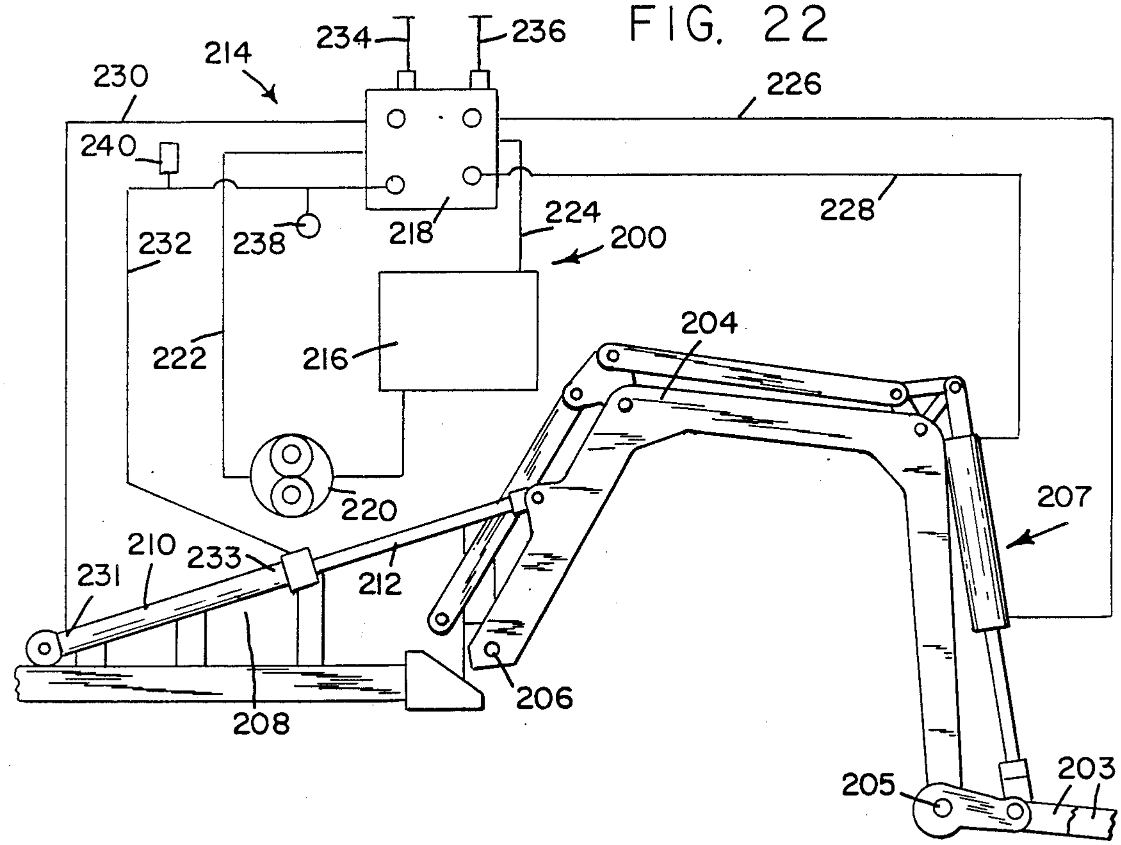
FIG. 22 is a hydraulic schematic diagram for the third modified weighing system.
Figure 23:
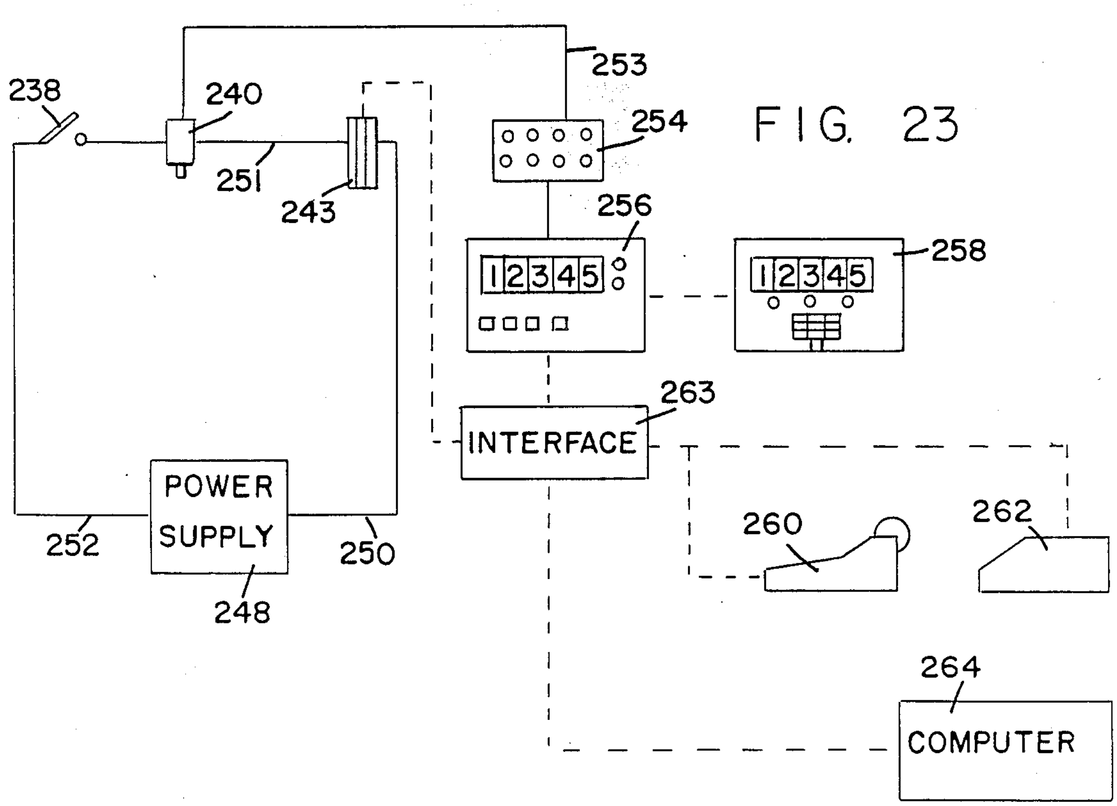
FIG. 23 is an electrical schematic diagram for the third modified weighing system.

Referring to FIGS. 21–23 there is illustrated a fourth embodiment of the present invention, generally indicated by the reference numeral 200. The weighing system 200 is shown in FIG. 21 applied to a front end loader refuse truck, generally indicated by the reference numeral 202. The refuse truck 202 is identical to the refuse truck 24 which is shown in FIG. 1 for handling a complimentary refuse container, such as container 26 which is shown in FIG. 1. The refuse truck 202 has a pair of forwardly extending support arms 203 which are identical to the arms 30 of the refuse truck 24 except that the arms 203 are not provided with a transducer housing, such as the housing 46 of FIG. 1. Each support arm 203 is pivotally connected to an inverted U-shaped boom 204 by means of a pivot pin 205. The boom 204 is pivotally connected to the side of the truck by a pivot pin 206. The support arm 203 is pivoted about the pin 205 by means of a first hydraulic actuator, generally indicated by the reference numeral 207. The boom 204 is pivoted about the pin 206 by means of a second hydraulic actuator, generally indicated by the reference numeral 208. The operation of the first and second actuators are independently controlled by the truck driver throughout a dumping operation. The servicing of a refuse container is identical to that of the refuse truck 24 for the first embodiment of the invention.

The second hydraulic actuator 208 comprises a hydraulic cylinder 210 which is pivotally connected to the truck body by a pivot pin 209 and a piston, not shown which is slidably mounted within the cylinder 210. A piston rod 212 is fixed at one end to the piston and is pivotally connected at its other end to the boom 204 by a pivot pin 213.

Referring particularly to FIG. 22, the hydraulic system for operating the first and second hydraulic actuators 207 and 208, respectively, is generally indicated by the reference numeral 214. The hydraulic system 214 includes a supply tank 216 for hydraulic fluid. A control valve 218 and a pump 220 which is located in a hydraulic line 222. The pump 220 pumps hydraulic fluid from the tank 216 under pressure through the control valve 218. Hydraulic fluid is returned from the control valve to the tank through a return line 224. The valve 218 is connected to the first hydraulic actuator 207 through hydraulic lines 226 and 228. The inner end of the cylinder 210, indicated by the reference numeral 231, is connected to the control valve 218 by means of a hydraulic line 230. The outer end 233 of the cylinder 210 is connected to the control valve 218 by a hydraulic line 232. The valve 218 is provided with actuators 234, 236. The actuator 234 controls the operation of the second hydraulic actuator 208. The actuator 236 controls the operation of the first hydraulic actuator 207. The boom 204 is raised by increasing the pressure in the hydraulic line 232 which causes the piston within the cylinder 210 to move from the outer end 233 to the inner end 231, thereby drawing the piston rod 212 into the cylinder. By decreasing the pressure in the line 232 relative to the line 230, the piston is caused to move from the inner end 231 of the cylinder 210 to the outer end 233 for returning the boom to the lowered or starting position shown in FIG. 22. A pressure actuated threshold switch 238 and a pressure transducer 240 are located in the hydraulic line 232 for a purpose to be described.

Referring particularly to FIG. 21, an electronic scale reader 243 generally indicated by the reference numeral 243 is operatively connected to the second hydraulic actuator 208. The scale reader 243 together with the threshold switch 238 and a pressure transducer 240 form part of a electro-mechanical weighing system which is associated with the hydraulic drive system of the vehicle. The scale reader 243 includes a base portion 242 which is fixed to the cylinder 210. The base portion 242 includes indicia which forms a linear scale along the length of the base portion. An electronic reader head 244 is slidably mounted on the base portion 242 for reading the indicia along the scale of the base portion. One end of a connecting rod 246 is connected to the reader head 244. The opposite end of the rod 246 is fixed to the outer end of the piston rod 212. Movement of the piston rod 212 into and out of the cylinder 210 causes the reader head 244 to move lengthwise along the base portion 242. The scale along the base portion 242 corresponds to the total movement of the piston rod 212 so that the indicia which is read by the reader at any point along the scale correlates with the position of the piston rod 212 relative to the cylinder 210. The scale reader may be purchased from Sokki Electronics Corporation of Japan or from their U.S.A. Office Sokki Electronics U.S.A. Inc. of De Planes, Ill. The pressure transducer can be purchased from Sensotec Inc. of Columbus, Ohio. The pressure actuator threshold switch can be purchased from Ashcroft, Dresser Instrument Division, Dresser Industries Inc. of Stratford, Ct.

Referring particularly to FIG. 23, the control circuitry for the weighing system of the fourth embodiment 200 includes a pair of power lines 250 and 252 connected to a power supply 248. The switch 238, the pressure transducer 240, and the electronic scale reader 243 are located on a line 251. The switch 238 is normally open so that the pressure transducer 240 and the electronic scale reader 243 are normally de-energized. Closing of the switch 238 completes a circuit across the power lines 250 and 252 along the line 251, thereby energizing the pressure transducer 240 and the electronic scale reader 243. The pressure transducer 240 is connected to a digitizer 254 by means of a line 253. When the pressure transducer 240 is energized, an analog electrical signal is transmitted through the line 253 to the digitizer 254 for conversion into a digital signal. The threshold switch 238 is adjustable and can be set to close at a desired predetermined pressure. The switch 238 closes when a predetermined pressure is reached in the line 232 at the beginning of a boom lifting operation. The switch 238 is set to close at a threshold pressure in line 232 which is less than that which would normally develop upon lifting of the lightest refuse container on the truck route. The digitizer 256 is provided with a visual digital readout means which enables the truck operator to see each weight reading. The digitizer 256 is also connected to a keyboard 258 for data input and selection of operation modes, such as net or gross weight, tare, track to zero and printout. The digitizer 256 is also connected to a printer 260, a card punching machine 262 and a computer 264 through an interface 263. The electronic scale reader 243 is also connected to the computer 264 through the interface 263. At the beginning of a boom lifting operation, there is an initial pressure surge in the line 232 this causes the pressure transducer 240 to transmit an unusually high analog signal which would result in an unusually high digital readout. For this reason, the computer 264 is programed to delay the digital readout from the digitizer 256 until the reader head 244 has moved a predetermined distance along the scale of the base portion 242. The analog signal from the pressure transducer 240 and the resulting digital signal from the digitizer 256 correlates with the pressure which is sensed at the delayed position of the reader head 244. The analog signal from the pressure transducer 240 is proportional to the pressure which is sensed in the line 232. The hydraulic pressure increases with an increase in container weight and decreases in a decrease in container weight. The analog signal from the transducer increases with an increase in hydraulic pressure and decreases with a decrease in hydraulic pressure. Because of the changes in the vertical movement arm of the boom during the lifting of the refuse container, the hydraulic pressure in the line 232 is different for different relative positions of the boom for a given container weight. The position of the reader head 244 along the scale correlates wih the position of the boom relative to the truck. A signal which is indicative of the relative position of the boom is fed to the computer. The computer is programed to provide a digital readout of the actual weight of the full refuse container based on a predetermined analog signal from the pressure transducer 240 for a particular relative position of the boom. Since the computer has a 11 of the data for converting a specific analog signal to a specific digital signal which is indicative of the actual weight of the refuse container for each relative position of the boom and "knows" the relative position of the boom because of signals from the reader 243, a digital readout of the actual weight of the container will occur at any position of the boom even though the analog signal varies from one position to another.

After the actual weight of the full container has been recorded, the boom is raised an additional amount and the refuse within the container is dumped into the truck. The boom is then lowered to return the empty container back to its resting or starting position. The hydraulic pressure in the line 232 when the boom is being lowered is different from the pressure in line 232 when the boom is being raised for a given weight at a given relative position of the boom. The computer is programmed to provide a digital readout of the actual weight of the empty refuse container based on a predetermined analog signal from the pressure transduced. However the digital readout values for a container which is being lowered are based on analog signal values which differ from the analog values when the container is being raised. The computer is also programmed so that when the scale reader reaches the same point on the scale at which a first digital signal was initiated, a second digital signal is initiated. This signal is based on the analog signal values for a downwardly moving boom. The second digital reading signal will provide a reading which is indicative of the weight of the empty refuse container. The point at which readings for the full container and the empty container are taken may vary from one location to another. For example, the refuse container at one location may be at ground level while the refuse container at another location may be on a platform or wall. Since the scale reader moves a predetermined distance after the closing of the threshold switch 238, the initial digital readout takes place when the reader is at different points along the scale at different locations. When the digital reading does take place, the boom is at different positions for different locations.

FIFTH EMBODIMENT OF THE INVENTION

Referring to FIGS. 24 and 25, the fifth embodiment of the present invention is generally indicated by the reference numeral 300 and is shown applied to a refuse truck 302 of the rear end loader type which is identical to the truck 98 which is shown in FIGS. 11 and 12 except for the lifting system for the refuse container. The refuse container lifting system of the truck 302 comprises hydraulic lifting means, generally indicated by the reference numeral 304. The hydraulic lifting means 304 includes a hydraulic cylinder 306 which is fixed to the top of the refuse truck. A piston, not shown, which is slidably mounted within the cylinder 306 and a piston rod 308 which is attached at one end to the piston. The other end of the piston rod 308 is attached to a stub shaft 310. A pair of idler pulleys 312 and 314 are mounted on opposite ends of the stub shaft 310 for free rotation about the axis of the stub shaft. A third idler pulley 116 is rotatably mounted on a vertical shaft 318 beneath the cylinder 306. A pair of guide pulleys 320 are rotatably mounted on a pair of horizontal shafts 322 which are supported between a pair of brackets 324 which are fixed to the rear top portion of the truck. One end of a cable 325 is looped around a U-shaped anchor bolt 326 and clamped to the cable 325 by a clamp 328. The cable 325 extends forwardly from the anchor fixture 326 to the pulley 314 and around the pulley 314 to the pulley 116. The cable 325 extends around the pulley 316 and rearwardly to the pulley 312. The cable then extends around the pulley 312 and rearwardly between the guide pulleys 320. The opposite end of the cable 325 is provided with a hook 330 for attaching to the refuse container in the same manner as the hook 120, as shown in FIGS. 11 and 12.

The weighing system 300 includes an electronic scale reader, generally indicated by the reference numeral 334 which is operatively connected to the hydraulic lifting means 304. The scale reader 334 includes a base portion 336 which is fixed to the cylinder 306 and a reader head 338 which is slidably mounted on the base portion 336. The base portion 336 is provided with indicia which comprise a longitudinal scale which can be read by the reader head 338 to determine the position of the piston rod 308 relative to the piston 306. The weighing system 300 also includes a threshold switch and a pressure transducer, not shown, operatively connected to the reader 334 in the same manner as the fourth embodiment of the invention. The weighing system 300 includes the same electrical components which are illustrated in FIG. 23 and the reader 334 is controlled in the same manner as the reader 243 of the fourth embodiment. The pressure transducer and the threshold switch are tied into the hydraulic system of the fifth embodiment in the same manner as the pressure transducer 240 and the threshold switch 238 are tied into the hydraulic system of the fourth embodiment except that these elements are located in the hydraulic line which is connected to the rear end of the cylinder 306.

At the beginning of a lifting operation by the hydraulic lifting means 304, the piston rod 308 is fully withdrawn within the cylinder 306 and the reader head 338 is positioned at the rearward end of the scale on the base portion 336, to the left as shown in FIGS. 24 and 25. This provides a maximum cable length rearward of the guide pulleys 320. This cable length is sufficient to reach the end of the longest refuse container on the truck route in the manner shown in FIG. 12. The refuse container is lifted in the same manner as illustrated in FIG. 12 relative to the rear end of the truck. The actuation of the piston rod 308 is controlled by a control valve actuator 332 at the rear of the truck. After the refuse container has been properly positioned relative to the truck and the hook 330 connected to the rear end of the refuse container, the operator manipulates the actuator 332 to extend the piston rod 308 forwardly which causes the refuse container to be lifted from its resting position on the ground to a dumping position above the rear opening of the truck. At the beginning of a lifting operation, the threshold switch closes to energize the pressure transducer and the electronic reader 338. When the threshold switch closes, the reader 338 moves a predetermined distance along the scale to initiate a digital readout which is indicative of the full refuse container. The analog signal from the pressure transducer changes with changes in hydraulic pressure in the line which supplies the rear end of the cylinder 306. The hydraulic pressure varies in accordance with the weight and relative position of the refuse container. The relative position of the refuse container is determined by the position of the reader head 338 relative to the scale on the base portion 336. Since a given hydraulic pressure is required to lift a refuse container of a given weight to a given relative relevant position, the analog signal which is received from the pressure transducer is indicative of the weight of the full container. As in the case of the fourth embodiment these factors are automatically computed to produce a digital readout which indicates the actual weight of the full refuse container. Another factor to be considered, is the size of the refuse container. If a shorter or longer refuse container is utilized, the starting position of the reader head 338 will be different. Also, the forces for lifting the container will differ as will the hydraulic pressure for each position of the container relative to the truck. The factors for computing the weight of a refuse container of one length will be different from the factors for computing the weight of a refuse container having a different length. Therefore, the computer program must include a set of factors for each type of container on the truck route. The information relating to the size of the container must be entered into the computer by the operator at the beginning of a lifting operation. If the containers on the route are of two or more standard types, the factors for each type are calculated and made part of the computer program. The factors for each type of containers are brought into the computer computation by entering a code symbol for the particular container type. The operator need only enter the code symbol into the computer for the particular type of container which is being processed. After the contents of the refuse container have been dumped into the rear opening of the refuse truck, the container is returned to its starting or resting position. As in the case of the fourth embodiment, when the empty container reaches the same relative position as when a digital readout was initiated for the weight of the full container, a second digital readout occurs. This second digital readout is indicative of the weight of the empty refuse container.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Weighing system for a refuse truck having a refuse receptacle which has a top opening and hydraulically actuated lifting means for engaging and lifting a refuse container which has a top opening from a resting position outside of the truck to an inverted position above the opening of the refuse receptacle to permit the contents of the refuse container to fall into the refuse receptacle, said lifting means also being effective to lower said refuse container to said resting position, said weighing system comprising:

(a) a fluid pressure transducer which is operatively connected to said hydraulically actuated lifting means of said refuse truck for sensing the weight of a refuse container when the container is lifted and lowered by the lifting means, said transducer being effective for generating an electrical analog signal which is proportional to the weight which is sensed by the transducer, (b) electrical digitizing means which is operatively connected to said transducer for converting said analog signal to a digital signal which is indicative of the weight which is sensed by the transducer, (c) a source of electrical power, and (d) electrical control means, including a normally open pressure actuated threshold switch which is operatively connected to said hydraulic system for connecting said transducer to said source of electrical power for energizing said transducer, said switch being operatively connected to said lifting means so that said switch is closed during the lifting of a full refuse container and during the lowering of an empty refuse container, said electrical control means being operatively connected to said electrical digitizing means for producing a first digital signal at a point during the lowering of an empty refuse container which is indicative of the weight of said empty refuse container.

2. Weighing system as recited in claim 1, wherein said first and second digital signals occur when the refuse container is at the same spatial position relative to the truck.

3. Weighing system as recited in claim 1, wherein said electrical control means comprises:

(a) an electronic scale reader which is operatively connected to said source of electrical power, said electrical digitizing means, said lifting means and said switch so that said scale reader is energized upon closing of said switch, and (b) a computer which is operatively connected to said transducer and said electronic positioning scale and said electrical digitizing means.

4. Weighing system as recited in claim 3, wherein said hydraulically actuated system includes a cylinder, a piston which is slidably mounted within the cylinder, a piston rod which is fixed to the piston, and a hydraulic pressure line which is operatively connected to the cylinder, and, wherein said electronic scale reader is operatively connected to the cylinder and the piston rod for measuring the relative movement between the piston rod and the cylinder.

5. Weighing system as recited in claim 3, wherein said transducer and said switch are operatively connected to said hydraulic pressure line.

* * * * *